(12) United States Patent
Holden et al.

(10) Patent No.: US 6,749,788 B1
(45) Date of Patent: Jun. 15, 2004

(54) METHOD AND APPARATUS FOR MAKING A SHAVING RAZOR HANDLE

(75) Inventors: John Philip Holden, Townsend, MA (US); Brian James McDonough, Braintree, MA (US); Mark F. Nascimento, Hampton, NH (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 09/696,989

(22) Filed: Oct. 26, 2000

(51) Int. Cl.[7] .................. B29C 45/16; B29C 45/14
(52) U.S. Cl. ........................... 264/247; 264/259
(58) Field of Search .................. 264/250, 245, 264/246, 247, 255, 259, 279.1, 271.1; 76/DIG. 8; 15/167.1; 30/37

(56) References Cited

U.S. PATENT DOCUMENTS

| | | | |
|---|---|---|---|
| 2,434,416 A | 1/1948 | Kohn et al. ............... 18/55.1 |
| 3,126,429 A | 3/1964 | Saffir ............................ 264/20 |
| 3,466,700 A | 9/1969 | Harrison ......................... 18/4 |
| 3,804,576 A * | 4/1974 | Hehl ........................... 425/130 |
| 3,832,110 A * | 8/1974 | Hehl ........................... 425/130 |
| 4,381,275 A | 4/1983 | Sorensen ................. 264/328.8 |
| 4,389,358 A | 6/1983 | Hendry ....................... 264/45.1 |
| 4,508,676 A | 4/1985 | Sorensen ................. 264/328.8 |
| 4,535,014 A | 8/1985 | Wright .......................... 428/30 |
| 4,867,672 A | 9/1989 | Sorensen ..................... 425/577 |
| 4,876,915 A * | 10/1989 | Iuchi ............................. 74/552 |
| 4,949,457 A | 8/1990 | Burout, III ..................... 30/85 |
| 5,027,511 A * | 7/1991 | Miller ........................... 16/430 |
| 5,049,344 A | 9/1991 | Sorensen ..................... 264/255 |
| 5,256,048 A | 10/1993 | Jacobs et al. ................ 425/130 |
| 5,458,400 A | 10/1995 | Meyer .......................... 300/21 |
| 5,497,551 A | 3/1996 | Apprille, Jr. .................... 30/85 |
| 5,573,791 A * | 11/1996 | Marcus ........................ 264/513 |
| 5,609,890 A | 3/1997 | Boucherie ................... 425/120 |
| D392,418 S * | 3/1998 | Gray ........................... D28/48 |
| 5,761,759 A | 6/1998 | Leversby et al. ........... 15/167.1 |
| 5,800,751 A | 9/1998 | Barker ........................ 264/46.6 |
| 5,890,296 A | 4/1999 | Metcalf et al. ................ 30/526 |
| 5,903,978 A | 5/1999 | Prochaska et al. ......... 30/34.05 |
| 6,051,176 A * | 4/2000 | Boucherie ................... 264/250 |
| 6,108,869 A * | 8/2000 | Meessmann et al. ........ 264/243 |
| 6,292,973 B1 * | 9/2001 | Moskovich et al. ....... 15/143.1 |
| 6,352,313 B1 * | 3/2002 | Wilson et al. .................. 300/4 |
| 6,367,112 B1 * | 4/2002 | Moskovich et al. ....... 15/143.1 |

FOREIGN PATENT DOCUMENTS

| | | | |
|---|---|---|---|
| DE | 2 133 340 | 7/1984 | |
| DE | 2 274 615 | 8/1994 | |
| DE | 198 58 102 A1 | 6/2000 | |
| JP | 61261014 A * | 11/1986 | ............ B25G/3/34 |
| WO | 02/06034 A1 | 1/2002 | |

OTHER PUBLICATIONS

International Search Report.

* cited by examiner

Primary Examiner—Mark Eashoo
(74) Attorney, Agent, or Firm—Fish & Richardson P.C.

(57) ABSTRACT

Manufacture of a shaving razor handle by molding an inner core of a first plastic in opposed first mold cavities, molding an outer portion of a second plastic around the inner core in opposed second mold cavities, and molding at least one elastomeric grip portion on the outer portion at opposed third mold cavities.

14 Claims, 3 Drawing Sheets

METHOD AND APPARATUS FOR MAKING A SHAVING RAZOR HANDLE

BACKGROUND OF THE INVENTION

The invention relates to the manufacture of plastic shaving razor handles.

Shaving razor handles are often made of molded plastic. It is known to first mold a portion of the handle of hard plastic and to then mold elastomeric grip portions at desired locations on the hard plastic portion.

SUMMARY OF THE INVENTION

The invention features, in general, making a shaving razor handle by molding an inner core of a first plastic in opposed first mold cavities, molding an outer portion of a second plastic around the inner core in opposed second mold cavities, and molding at least one elastomeric grip portion on the outer portion at opposed third mold cavities.

Preferred embodiments of the invention may include one or more of the following features. In preferred embodiments, the first and second plastic can have the same composition and can have the same or a different color. E.g., both plastics can be of clear plastic. The inner core can be molded about an engagement member and can be moved from the first mold cavities to the second mold cavities by moving the engagement member. The inner core and additional plastic added at the second mold cavities can be moved from the second mold cavities to the third mold cavities by moving the engagement member. A plurality of inner cores of the first plastic can be simultaneously molded at first mold cavities. A plurality of outer portions of the second plastic are simultaneously molded at the second mold cavities. A plurality of elastomeric grip portions can be simultaneously molded at third mold cavities. The inner core and additional plastic can be removed from the engagement member after molding the grip portion, and a handle connection component that has a shape that is similar to the shape of the engagement member can be attached to the handle. The inner core can have a hole passing therethrough, and the additional plastic for the outer portion can be gated through the hole from a first side surface of the inner core to a second side surface of the inner core. A portion of the inner core can be supported at the first side against a mold surface while the additional plastic flows past the second side surface.

In another aspect, the invention features a shaving razor handle made by the method described.

In another aspect, the invention features apparatus for carrying out the method described.

Embodiments of the invention may include one or more of the following advantages. A thick plastic portion of a shaving razor handle can be efficiently molded in two steps by reducing the amount and thickness of plastic that is injected and cured at one time. By injecting the plastic in two steps, the formation of the part is much quicker than it would be if the entire amount of plastic were injected in a single step. Quick curing can desirably provide for maintenance of a textured surface finish that might otherwise melt to a smooth surface with dissipation of heat from a thick molded part.

Other advantages and features of the invention will be apparent from the following description of a particular embodiment thereof and from the claims.

DESCRIPTION OF A PARTICULAR EMBODIMENT

Figure 1:
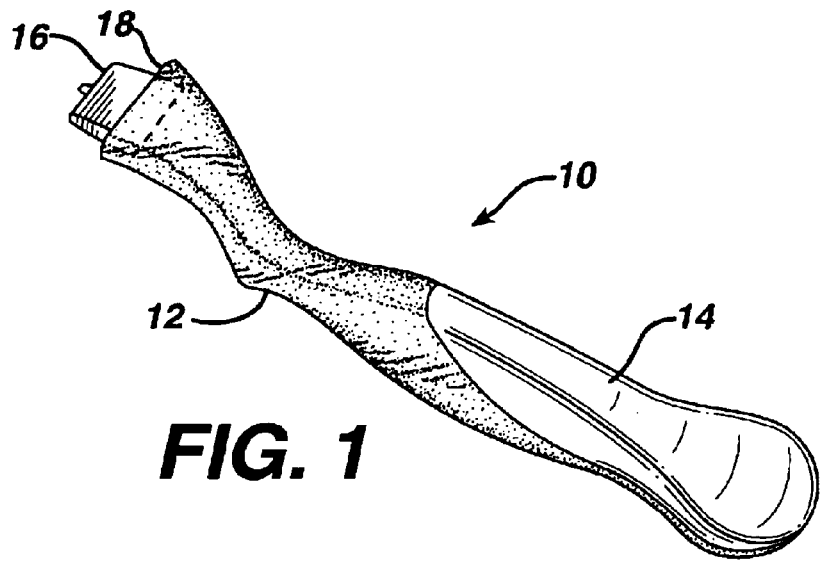
FIG. 1 is a perspective view of a molded shaving razor handle.
Figure 2:
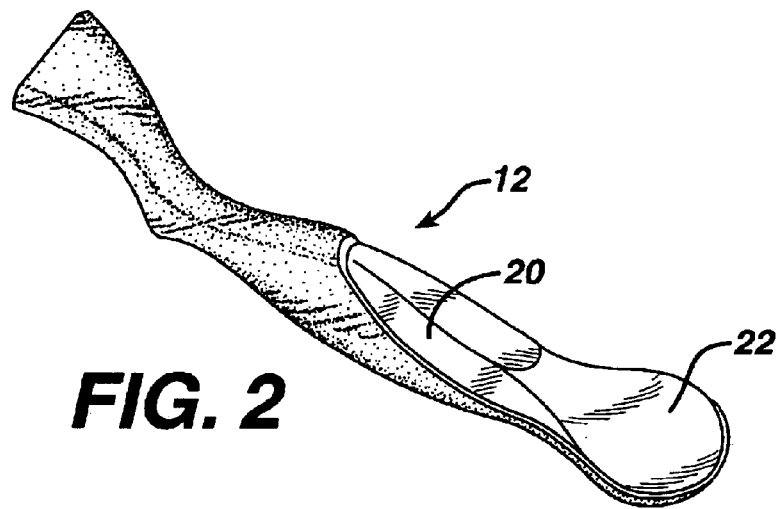
FIG. 2 is a perspective view of an elongated part of the FIG. 1 handle during manufacture.
Figure 3:
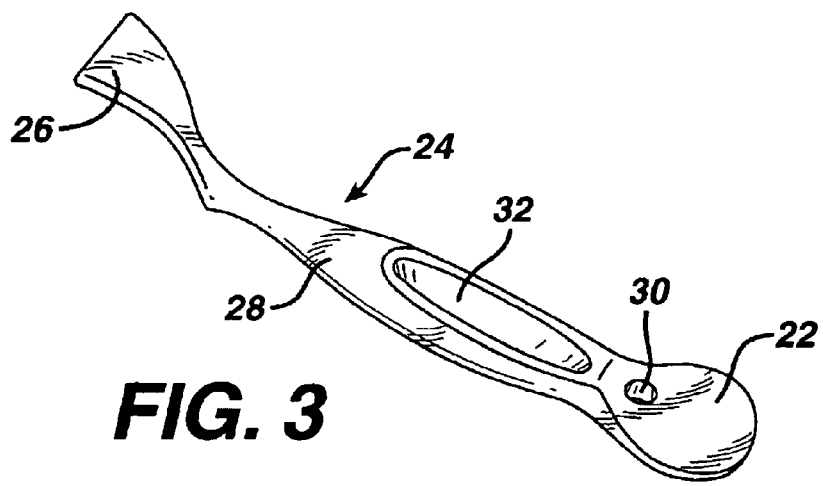
FIG. 3 is a perspective view of an inner core portion of the FIG. 1 handle during manufacture.

Referring to FIG. 1, shaving razor handle 10 includes elongated part 12 made of clear acrylonitrile butadiene styrene (ABS) available from Denka and grip portion 14 made of elastomeric material available under the Krayton trade designation. Subassembly 16, used to connect to a shaving razor cartridge (not shown) to handle 10, is secured in a recess in front end 18 of part 12. FIG. 2 shows elongated ABS part 12 prior to adding grip portion 14 and securing subassembly 16. Part 12 includes a recessed portion 20 and concave surface 22 on which grip portion 14 is secured. FIG. 3 shows inner core 24, which is made of the same ABS as the rest of part 12 and includes the inner portion of elongated part 12. (Alternatively, different color plastics can be used for inner core 24 and the outer portion.) Inner core 24 includes concave surface 22, an end 26 that is thinner than end 18, and a central portion 28 that is thinner than the central portion of part 12 and includes gating through-hole 30 and elongated slotted recess 32.

Figure 4:
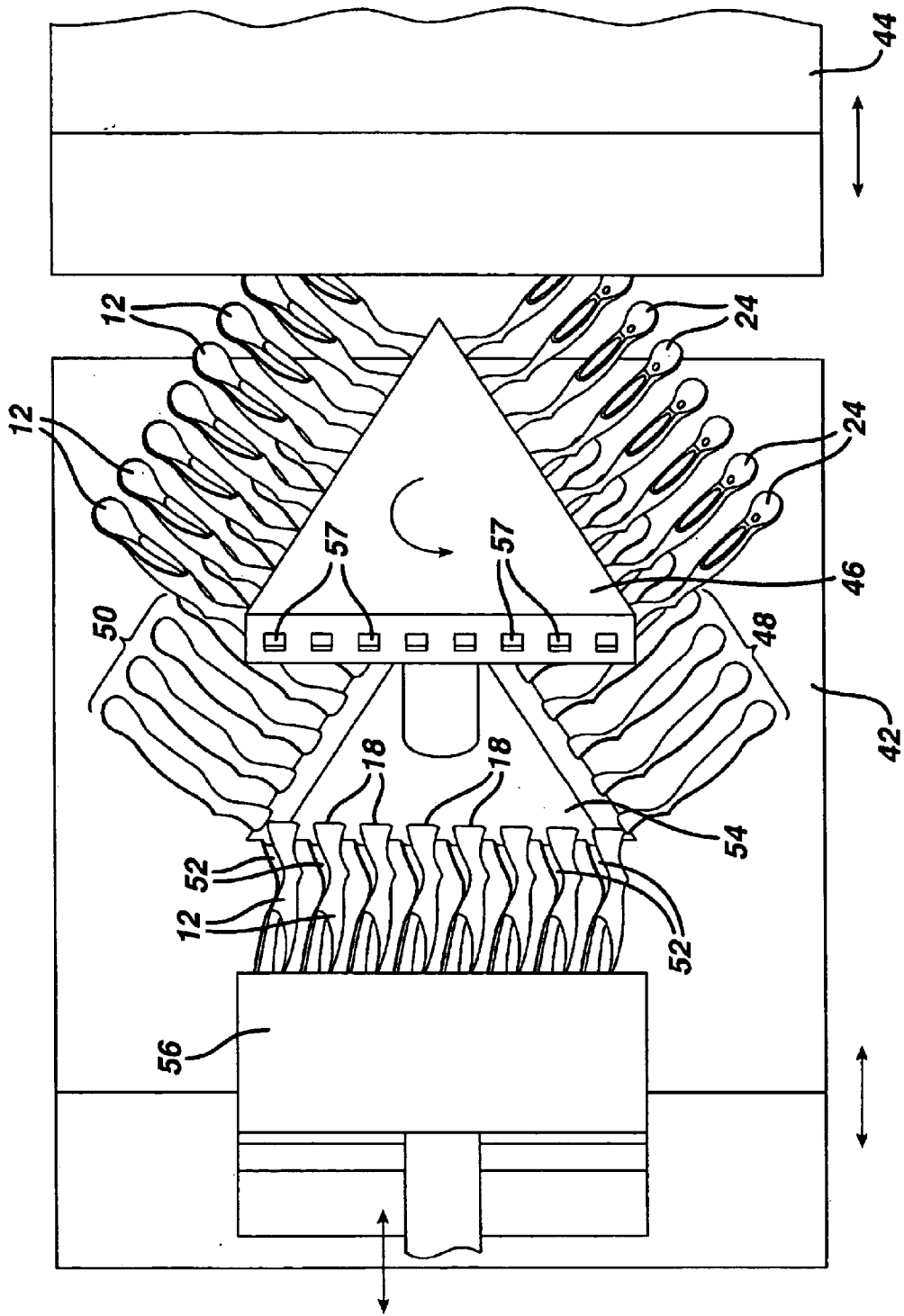
FIG. 4 is a perspective view showing molding apparatus used to make the components shown in FIGS. 1, 2, and 3.

Manufacture of handle 10 includes a three-step molding process using the apparatus shown in FIGS. 4–7 and the subsequent attachment of subassembly 16. Referring to FIG. 4, molding apparatus 40 includes first mold assembly 42, second mold assembly 44, and triangular mold part 46. First mold assembly 42 includes three sets of mold cavities 48, 50, and 52. Each set includes cavities for molding eight handle parts at the same time. Mold cavities 48 are used to mold inner cores 24. Mold cavities 50 are used to add additional plastic to inner cores 24 in order to result in elongated handle part 12. Mold cavities 52 are used to add elastomeric grip portions 14. Second mold assembly 44 includes three corresponding sets of mold cavities aligned with cavities 48, 50 and 52. Mold part 46 is rotatable and also can be moved out of and into first assembly 42 when second assembly 44 is separated in order to move molded parts out of one set of cavities, rotate them, and move the molded parts into the next set of cavities. Mold part 46 is shown in the separated position in FIG. 4. When mold part 46 is retracted, it sits within triangular recess 54 and components secured to it are aligned with and placed in respective cavities.

In the position shown in FIG. 4, inner cores 24 that have just been formed in cavities 48 have been moved out of cavities 48. Similarly, elongated parts 12 that have just received additional plastic in mold cavities 50 are shown moved out of cavities 50. The handle parts that include grip portions 14 are shown being removed sideways out of the mold apparatus by product gripper 56 after the parts have been moved out of cavities 52 (partially hidden by parts 12 and gripper 56 in FIG. 4). From the position shown in FIG. 4, mold part 46 will be rotated counter-clockwise 120 degrees such that inner cores 24 become aligned with mold cavities 50, and elongated parts 12 become aligned with mold cavities 52. Mold part 46 will then be retracted into recess 54 with inner cores 24 in respective cavities 50, and elongated parts 12 in respective cavities 52. Engagement members 57 (also shown in FIG. 7), will also be aligned with and located in the ends of cavities 48. First and second mold assemblies 42 and 44 will then be brought together, and plastic will be injected into cavities 48 to form inner cores 24 at the same time that additional plastic is injected into cavities 50 to provide additional plastic around inner cores 24 to result in elongated parts 12, and the elastomeric material is injected into cavities 52 to provide grip portions 14 on elongated parts 12. The first and second assemblies will then be separated, mold part 46 will be moved sideways, and gripper 56 will remove completed handle parts with grip portions 14 prior to rotation of mold part 46 and the subsequent mold operation.

Figure 5:
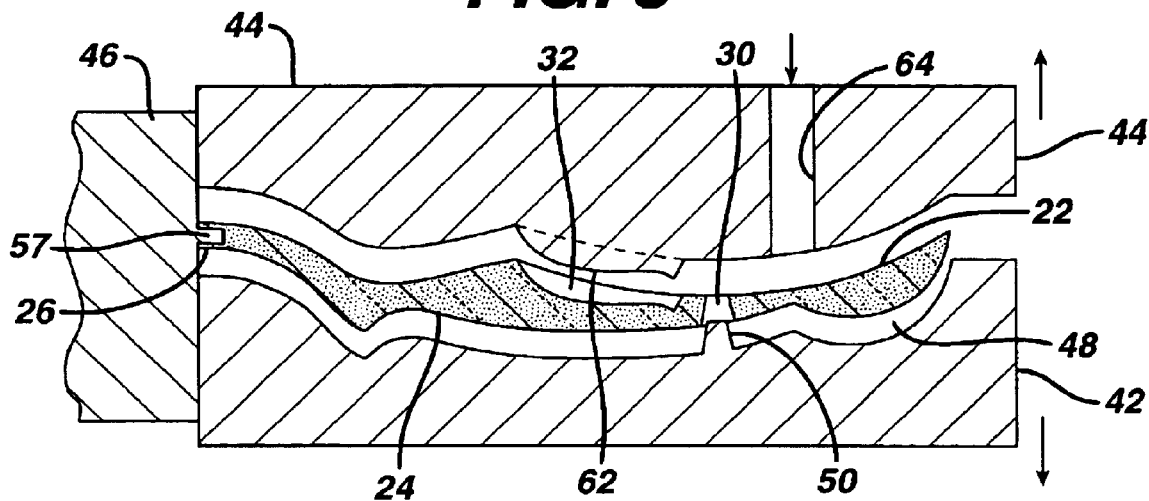
FIG. 5 is a vertical sectional view of a portion of the FIG. 4 molding apparatus used to make the FIG. 3 inner core.

Referring to FIG. 5, mold assemblies 42 and 44 are shown beginning to separate from each other after molding of inner core 24 in mold cavity 48. End 26 of inner core 24 has been molded around engagement member 57 on mold part 46 and remains secured to it. Frustoconical protrusion 60 on sub-assembly 42 provides hole 30. Elongated fin 62 on assembly 44 provides elongated slot 32. Gate 64 is used to inject the plastic into cavity 48.

Figure 6:
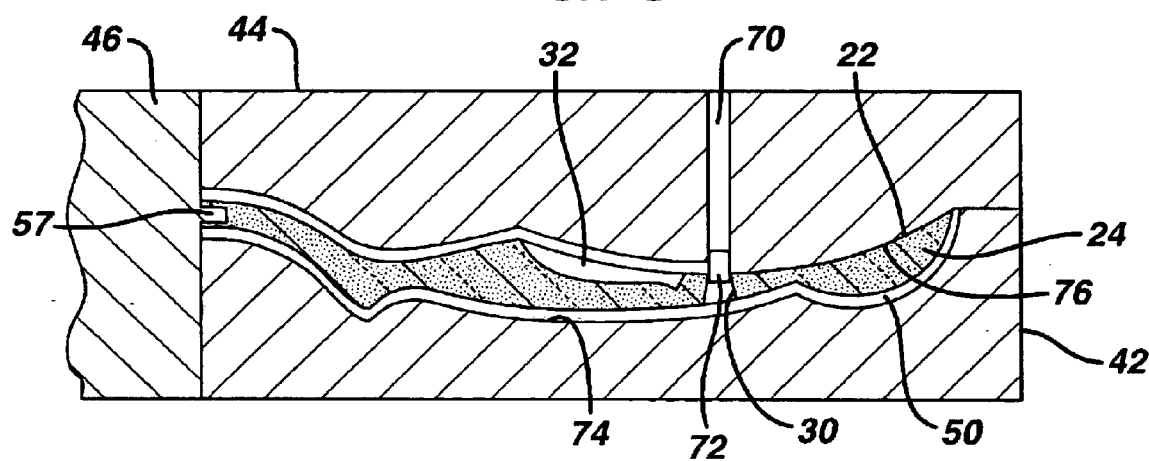
FIG. 6 is a vertical sectional view of a portion of the FIG. 4 molding apparatus used to make the FIG. 2 part.
Figure 7:
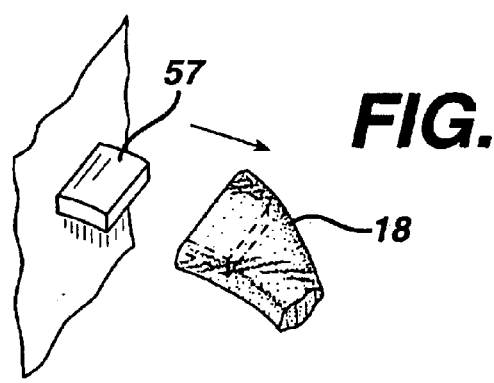
FIG. 7 is a perspective view showing an engagement member of the FIG. 4 apparatus used to engage an end of the FIG. 3 inner core during manufacture.

Referring to FIG. 6, mold assemblies 42 and 44 are shown in position at a cavity SO prior to injection of plastic through gate channel 70. Tubular member 72 at the end of gate channel 70 extends into opening 30 in order to direct plastic to the underside of inner core 24. The plastic proceeds along the lower surfaces of inner core 24 above the upper surface 74 of cavity 50 in the lower assembly 42 and extends to both sides. The plastic underneath inner core 24 causes concave portion 22 to push against the corresponding convex portion 76 of second mold assembly 44. The plastic flowing toward the front of inner core 24 proceeds up to the front end and flows around the sides to the top of inner core 24, eventually filling elongated slot 32. The additional plastic injected into cavity 50 tends to remelt the surface of inner core 24 thereby providing an integral plastic part 12 of uniform, high clarity. The surfaces of the mold defining cavities 52 are textured to impart textured surfaces to part 12.

Apparatus 40 provides for efficiently molding the thick plastic portion of elongated part 12 by reducing the amount and thickness of plastic that is injected and cured at one time. Thus, after formation of inner core 24, the relatively small volume of inner core 24 quickly cures and is moved to a cavity 50. In cavity 50, the additional plastic around inner core is sufficiently thin that it can also quickly cure. By doing the injection of plastic in two steps, the formation of the part is much quicker than it would be if the entire amount of plastic were injected in a single step. The quick curing desirably provides for maintenance of a textured surface finish on part 12 that might otherwise melt to a smooth surface with dissipation of heat from a thick molded part.

Other embodiments of the invention are within the scope of the appended claims.

What is claimed is:

1. A multi-step molding method of making a shaving razor handle comprising
    molding a solid inner core of a first plastic at opposed first mold cavities, said inner core providing a purely internal member without any external surface portions,
    molding an outer portion of a second plastic around said inner core at opposed second mold cavities, said outer portion including first external surface portions,
    molding at least one elastomeric grip portion on said outer portion at opposed third mold cavities, said elastomeric grip portion including second external surface portions, said handle having an external surface including said first and second external grip portions and not including said first plastic.

2. The method of claim 1 wherein said first and second plastic have the same composition.

3. The method of claim 1 wherein said first and second plastic have the same composition except the compositions have different colors.

4. The method of claim 1 wherein said molding an inner core includes molding a portion of said inner core about an engagement member, and further comprising moving said inner core from said first mold cavities to said second mold cavities prior to said molding an outer portion.

5. The method of claim 4 further comprising moving said inner core and said outer portion from said second mold cavities to said third mold cavities prior to said molding said at least one grip portion.

6. The method of claim 4 further comprising removing said inner core from said engagement member after said molding said grip portion, and thereafter attaching a handle connection component that has a shape that is similar to the shape of said engagement member.

7. The method of claim 1 wherein a plurality of inner cores of a first plastic are simultaneously molded at said first mold cavities.

8. The method of claim 7 wherein a plurality of outer portions of said second plastic are simultaneously molded at said second mold cavities.

9. The method of claim 8 wherein a plurality of elastomeric grip portions are simultaneously molded at said third mold cavities.

10. The method of claim 1 wherein said molding an inner core includes molding an inner core having a hole passing therethrough, and wherein said molding an outer portion includes gating plastic for said outer portion through said hole from a first side surface of said inner core to a second side surface of said inner core.

11. The method of claim 10 wherein said molding an outer portion includes supporting said first side against a mold surface while said plastic flows past said second side surface.

12. A multi-step molding method of making a shaving razor handle comprising
    molding a solid inner core of a first plastic at opposed first mold cavities,
    molding an outer portion of a second plastic around said inner core at opposed second mold cavities, and
    molding at least one elastomeric grip portion on said outer portion at opposed third mold cavities, said first and second plastics having the same composition and appearance.

13. The method of claim 12 wherein said first and second plastic are both clear plastic.

14. The method of claim 13 wherein said molding an outer portion includes providing said outer portion with a surface texture.

* * * * *